E. H. FROHNER.
METHOD OF AND APPARATUS FOR TREATING OIL AND OBTAINING BY-PRODUCTS THEREFROM.
APPLICATION FILED JAN. 4, 1918.
1,329,076.
Patented Jan. 27, 1920.
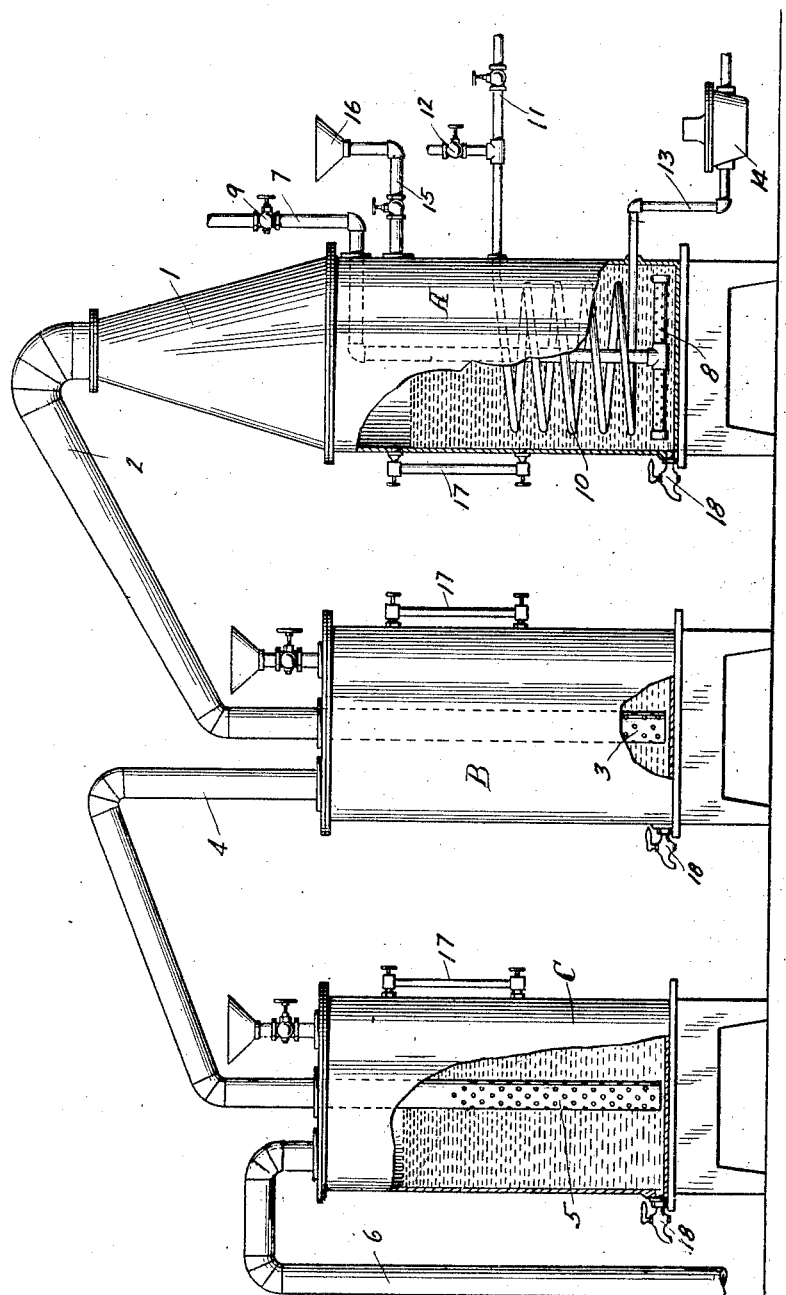
WITNESSES
INVENTOR
E. H. Frohner
BY
ATTORNEYS

UNITED STATES PATENT OFFICE.

EDWARD H. FROHNER, OF YOUNGSTOWN, OHIO, ASSIGNOR TO STANDARD OILCLOTH CO., OF NEW YORK, N. Y., A CORPORATION OF OHIO.

METHOD OF AND APPARATUS FOR TREATING OIL AND OBTAINING BY-PRODUCTS THEREFROM.

1,329,076.    Specification of Letters Patent.    Patented Jan. 27, 1920.

Application filed January 4, 1918. Serial No. 210,347.

*To all whom it may concern:*

Be it known that I, EDWARD H. FROHNER, a citizen of the United States, and a resident of Youngstown, in the county of Mahoning and State of Ohio, have invented a new and Improved Method of and Apparatus for Treating Oil and Obtaining By-Products Therefrom, of which the following is a full, clear, and exact description.

This invention relates to a method of and apparatus for treating oil and obtaining by-products therefrom whereby the oil may be oxidized or "blown", the fumes given off during the oxidizing step of the method collected, the oil contained in the fumes recovered and the acrolein in the fumes removed.

The methods heretofore employed in treating oils have been satisfied by simply "blowing" the oil and allowing the fumes given off during the blowing or oxidizing process to escape to the atmosphere. These fumes not only contain oil which of course is wasted, but also contain acrolein, which is very obnoxious and is the cause of the intolerably pungent odor attending the blowing of oils as now practised, acrolein resulting from the decomposition of the glycerin contained in oils and fats containing glycerin. Its vapors are intensely irritating, causing copious flowing of tears from the eyes, attended with headache, nervousness and irritability. Owing to these obnoxious fumes oil-treating plants are not permitted to operate in settled communities and despite the fact that oil has been treated for years with these objections ever present, no successful attempts, so far as can be ascertained, have been made to overcome them. As noted above, these objections have all been overcome in the present method and the method may be therefore practised at any plant without danger or discomfort to the community. The apparatus employed in carrying out the method of the present invention is comparatively simple and inexpensive to manufacture and install, reliable and efficient in use and easy to operate.

In the accompanying drawing,

The figure is a front view of the apparatus with portions broken away to illustrate the details of construction.

Referring to the drawing, A designates the blowing or oxidizing tank, which is an upright cylinder having a collecting cone 1 at its top which is provided with a sealed conduit 2 that has a perforated discharge end 3 extending downwardly into the solvent tank B. The top of this tank is connected by a sealed conduit or closed pipe 4 with a water containing tank C, into which the perforated end 5 of the pipe 4 extends, and the tank C has its top connected with a blow-off or vent pipe 6 which leads to a bed of charcoal, coke or other porous material, or into a room not shown for the final escape of the air which passes through the apparatus during the blowing operation.

The tank A is supplied with air for blowing the oil to be treated through a pipe 7 that leads into the side of the tank near the top and extends downwardly toward the bottom where it has a perforated head 8, there being a cut-off valve 9 in the pipe for controlling the supply of air. Also within the tank A is a coil of pipe 10 which has valved branches 11 and 12 for connection respectively with a source of steam and a source of water, and the lower or discharge end of the coil is connected with a drain pipe 13 which may be provided with a trap 14. The oil is supplied through a valved pipe 15 connected with the top portion of the tank, and on this pipe is a filling funnel 16. The tank A as well as the other tanks is provided with gage glasses 17 for indicating the level and the tanks also have draw-off cocks 18 or equivalent means for drawing off the contents.

After the oil has been supplied to the tank A the steam is supplied to the coil 10 by opening the valve in the branch 11, and when the oil has been heated to the desired temperature and for the required period of time, the steam is cut off and cold water is then permitted to flow through the coil 10 by opening the valve in the branch 12 so that the oil will be cooled to the desired temperature. Air or air and oxygen gas are caused to pass into the oil through the pipe 7 and head 8, and during this blowing operation the fumes and gases are carried over into the air-tight tank B through the collecting cone 1 and the pipe 2. After being thus treated the oil in the tank A is drawn off and another charge supplied.

The fumes carried from the tank A are caused to percolate through the solvent in the tank B. This solvent is of such a nature as to have an affinity for the oil particles that are carried over in the fumes, and a solvent, such as gasolene, naphtha, kerosene, turpentine or any vegetable or mineral oil may be employed. The purpose of this step in the method is to collect the oil contained in the fumes. The fumes carried off from the tank B are conducted through the tank C, which contains water, or water to which either an alkali or an acid is added, so that in this tank will be collected the acids, such as acrolein, which are contained in the fumes. The fumes are now separated from the obnoxious and poisonous fumes and gases and may be discharged into the atmosphere without being objectionable.

From the foregoing description taken in connection with the accompanying drawing, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. In a closed system, the method which consists in passing the gases, arising from the blowing of fatty oil, directly through a solvent to recover the oil contained in said gases, and then passing the gases freed of oil directly through an alkaline solution to remove the acrolein contained in said gases.

2. In a closed system, the method which consists in heating fatty oil, blowing air therethrough to oxidize the same, passing the gases arising from thus treating the oil directly through a solvent to recover the oil contained in said gases, and then passing the gases freed of oil directly through an alkaline solution to remove the acrolein contained in said gases.

EDWARD H. FROHNER.